(12) United States Patent
Kim

(10) Patent No.: US 12,270,670 B2
(45) Date of Patent: Apr. 8, 2025

(54) METHOD AND SYSTEM FOR PROVIDING NAVIGATION SERVICE BASED ON USER DRIVING ROUTE

(71) Applicant: LINE Plus Corporation, Seongnam-si (KR)

(72) Inventor: Sujeong Kim, Seongnam-si (KR)

(73) Assignee: Line Plus Corporation, Seongnam-si (KR)

( * ) Notice: Subject to any disclaimer, the term of this patent is extended or adjusted under 35 U.S.C. 154(b) by 205 days.

(21) Appl. No.: 18/062,139

(22) Filed: Dec. 6, 2022

(65) Prior Publication Data
US 2023/0175853 A1    Jun. 8, 2023

(30) Foreign Application Priority Data
Dec. 6, 2021    (KR) .................. 10-2021-0173244

(51) Int. Cl.
*G01C 21/36*    (2006.01)
*G01C 21/34*    (2006.01)

(52) U.S. Cl.
CPC ..... *G01C 21/3617* (2013.01); *G01C 21/3415* (2013.01); *G01C 21/362* (2013.01)

(58) Field of Classification Search
CPC ............ G01C 21/3617; G01C 21/3415; G01C 21/362
See application file for complete search history.

(56) References Cited

U.S. PATENT DOCUMENTS

| | | | |
|---|---|---|---|
| 2004/0030490 A1* | 2/2004 | Hegedus | G01C 21/343 701/532 |
| 2006/0069501 A1* | 3/2006 | Jung | G08G 1/096827 701/457 |
| 2010/0138149 A1* | 6/2010 | Ohta | H04M 1/6091 340/425.5 |
| 2011/0066634 A1* | 3/2011 | Phillips | G10L 15/22 707/769 |
| 2015/0032366 A1* | 1/2015 | Man | G08G 1/096716 701/414 |
| 2015/0160019 A1* | 6/2015 | Biswal | G06Q 50/01 701/1 |
| 2016/0021153 A1* | 1/2016 | Hull | G06F 16/337 715/753 |
| 2016/0216123 A1* | 7/2016 | Liao | G06Q 10/109 |
| 2016/0371300 A1* | 12/2016 | Yamada | G08G 1/096716 |
| 2017/0314955 A1* | 11/2017 | Lynn | G01C 21/3484 |
| 2018/0216950 A1* | 8/2018 | Seagraves | G01C 21/3484 |
| 2018/0283891 A1* | 10/2018 | Andrew | G01C 21/3679 |
| 2019/0265059 A1* | 8/2019 | Warnick | G05D 1/0291 |

(Continued)

*Primary Examiner* — Naeem Taslim Alam
(74) *Attorney, Agent, or Firm* — Harness, Dickey & Pierce, P.L.C.

(57) ABSTRACT

A method for providing a navigation service based on user driving route is provided, which is executed by one or more processors of a user terminal, and includes, in response to a user input including a metadata search term, outputting one or more user driving routes associated with the metadata search term, in response to a user input of selecting a user driving route from among the one or more user driving routes, outputting information associated with the selected user driving route, and in response to a user input of starting driving guidance, outputting driving guidance information according to the selected user driving route.

19 Claims, 12 Drawing Sheets

(56) References Cited

U.S. PATENT DOCUMENTS

| | | | |
|---|---|---|---|
| 2019/0325758 A1* | 10/2019 | Yoshii | G01C 21/34 |
| 2020/0096354 A1* | 3/2020 | Duquene | G01C 21/3415 |
| 2020/0331492 A1* | 10/2020 | Itoh | B60W 50/06 |
| 2021/0112441 A1* | 4/2021 | Sabella | H04W 24/04 |
| 2022/0058495 A1* | 2/2022 | Shou | G16H 40/20 |

* cited by examiner

12,270,670 B2

METHOD AND SYSTEM FOR PROVIDING NAVIGATION SERVICE BASED ON USER DRIVING ROUTE

CROSS-REFERENCE TO RELATED APPLICATION

This application claims priority under 35 U.S.C § 119 to Korean Patent Application No. 10-2021-0173244, filed in the Korean Intellectual Property Office on Dec. 6, 2021, the entire contents of which are hereby incorporated by reference.

TECHNICAL FIELD

The present disclosure relates to a method and/or a system for providing a navigation service based on user driving route. For example, to a method and/or a system for providing a navigation service capable of searching, sharing and/or subscribing to a user driving route associated with metadata.

BACKGROUND

Mobile devices such as smartphones and the like are widely used, and the number of users who use navigation applications (or driving guidance applications) through mobile devices is increasing. In order to meet the above needs, navigation applications have evolved in the direction of advancing route search algorithms to enable users to arrive at their destinations most efficiently. For example, development of recent navigation applications are in the direction of providing technologies for advancing real-time traffic condition-reflecting algorithms so as to guide the optimal detour route to the destination, or technologies for providing the route with the shortest distance and the least amount of time to the destination according to the user's preference, or the like.

Meanwhile, in general, users are unilaterally provided with a driving guidance to destination by the navigation applications, and there is inconvenience in that the user has to directly input a stopover or reset the route if the user wants to change the route. Accordingly, when the user is visiting a new area for the first time and wants to visit new tourist destinations, attractions, or the like while he or she is in the area, it is inconvenient for the user since he or she has to separately search the Internet to input the desired destination.

SUMMARY

In order to address one or more problems (e.g., the problems described above and/or other problems not explicitly described herein), the present disclosure provides a method for, a non-transitory computer-readable recording medium storing instructions for, and/or a system (device) for providing a navigation service based on user driving route.

The present disclosure may be implemented in a variety of ways, including a method, a system (device), or a computer program stored in a readable storage medium.

Some example embodiments relate to a method of providing navigation guidance based on user navigation routes to a user of a user terminal, the user terminal including one or more processors.

In some example embodiments, the method includes outputting one or more of the user navigation routes associated with a metadata search term, in response to a user inputting the metadata search term; outputting information associated with a selected user navigation route, in response to the user inputting the selected user navigation route from among the one or more user navigation routes; and outputting navigation guidance information according to the selected user navigation route, in response to the user inputting a request to begin the navigation guidance.

In some example embodiments, the method further includes transmitting navigation route information to an external device for storage in a database, in response to the user inputting data associated with the navigation route information, the navigation route information including a navigation route and metadata associated with the navigation route, the navigation route including a departure point, one or more stopovers and a destination.

In some example embodiments, the outputting the information associated with the selected user navigation route includes: outputting a departure point, one or more stopovers, and a destination associated with the selected user navigation route, metadata associated with the selected user navigation route, and a required time.

In some example embodiments, the method further includes changing the selected user navigation route to a changed user navigation route, in response to the user inputting a request to change at least one of the departure point, the one or more stopovers, or the destination.

In some example embodiments, the method further includes outputting the navigation guidance information according to the changed user navigation route, in response to the user inputting the request to begin the navigation guidance.

In some example embodiments, the method further includes transmitting information associated with the changed user navigation route to an external device for storage in a database, in response to the user inputting a request to store the changed user navigation route.

In some example embodiments, the method further includes requesting input of an evaluation score associated with the selected user navigation route; and transmitting the evaluation score to an external device for storage in a database in association with the selected user navigation route, in response to receipt of the input of the evaluation score.

In some example embodiments, the method further includes requesting input of an evaluation score associated with a stopover included in the selected user navigation route; and transmitting the evaluation score to an external device for storage in a database in association with the stopover, in response to receipt of the input of the evaluation score.

In some example embodiments, the one or more user navigation routes associated with the metadata search term each includes a recommendation index determined based on an evaluation score associated with the user navigation routes, and the outputting the one or more user navigation routes associated with the metadata search term includes sorting the one or more user navigation routes based on the recommendation index.

In some example embodiments, the outputting the navigation guidance information according to the selected user navigation route includes outputting a recommended stopover for changing the selected user navigation route to a new navigation route.

In some example embodiments, the method further includes determining the recommended stopover based on one or more of a current time or a navigation time period.

In some example embodiments, the metadata search term includes a search term for retrieving hashtags associated with navigation routes registered by another user.

In some example embodiments, the outputting the one or more user navigation routes associated with the metadata search term includes outputting a navigation route associated with the metadata search term and a navigation route that is stored by another user registered as a contact of the user.

In some example embodiments, the outputting the one or more user navigation routes associated with the metadata search term includes outputting a navigation route associated with the metadata search term and a navigation route that is stored by another user registered as a contact of the user.

In some example embodiments, the method further includes outputting, while providing the navigation guidance based on the selected user navigation route, a request to change the selected user navigation route to a new navigation route recommended by another user registered as a contact of the user.

Some other example embodiments relate to a method of providing navigation guidance based on user navigation routes to a user of a user terminal, the user terminal including one or more processors.

In some example embodiments, the method includes outputting one or more of the user navigation routes to a user of the user terminal, the user navigation routes being generated by an account associated with another user terminal subscribed to by the user of the user terminal; outputting information associated with a selected user navigation route, in response to the user inputting the selected user navigation route from among the one or more user navigation routes; and outputting navigation guidance information according to the selected user navigation route, in response to the user inputting a request to begin the navigation guidance.

Some other example embodiments relate to non-transitory computer-readable recording medium storing instructions that, when executed by one or more processors of a user terminal, cause the user terminal to perform of a method of operating a user terminal to provide navigation guidance based on user navigation routes.

Some other example embodiments relate to a user terminal configured to provide navigation guidance based on user navigation routes.

In some example embodiments, the user terminal includes a memory configured to store one or more computer-readable programs; and one or more processors configured to execute the one or more computer-readable programs to configure the user terminal to, output one or more of the user navigation routes associated with a metadata search term, in response to a user inputting the metadata search term, output information associated with a selected user navigation route, in response to the user inputting the selected user navigation route from among the one or more user navigation routes, and output navigation guidance information according to the selected user navigation route, in response to the user inputting a request to begin the navigation guidance.

In some example embodiments, the user terminal is further configured to, transmit navigation route information to an external device for storage in a database, in response to the user inputting data associated with the navigation route information, the navigation route information includes a navigation route and metadata associated with the navigation route, the navigation route including a departure point, one or more stopovers and a destination.

The effects of the present disclosure are not limited to the effects described above, and other effects not described herein can be clearly understood by those of ordinary skill in the art (hereinafter referred to as "ordinary technician") from the description of the claims.

BRIEF DESCRIPTION OF THE DRAWINGS

The above and other objects, features and advantages of the present disclosure would be described with reference to the accompanying drawings described below, where similar reference numerals indicate similar elements, but not limited thereto, in which.

DETAILED DESCRIPTION

Figure 1:
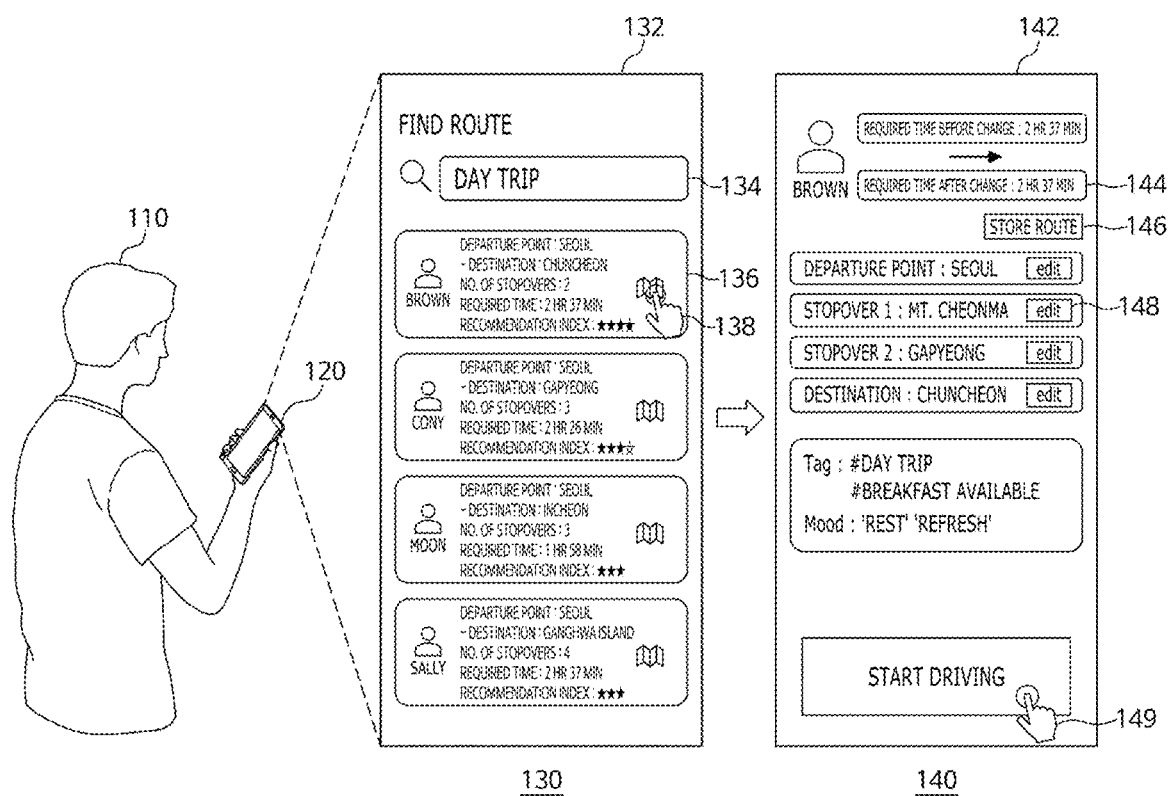
FIG. 1 is a diagram illustrating an example in which a user uses a navigation service based on user driving route by using a user terminal.

Hereinafter, examples for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed embodiment(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the embodiment(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, if a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, in general, "metadata" may refer to information on data. Specifically, as the metadata, information on user driving route may represent information on a driving route that the user may input when registering driving routes. For example, "metadata associated with user driving route" may refer to information such as a hashtag associated with a place, search data associated with the driving route (or a search term associated with the driving route), and the like.

In the present disclosure, the "user account" may represent an account created and used by a user in a driving guidance application or data related thereto. In addition, the user account of the driving guidance application may refer to a user who uses the driving guidance application. In addition, the user account may refer to a user account associated with a screen of the user terminal illustrated in the drawings to be described in detail below.

In the present disclosure, "subscribing" may refer to an act of a user transmitting, in the driving guidance application, request information to another user account to continuously receive data such as postings, driving routes, and the like created from the another user account, and/or a state of continuously receiving data from the another user. Another user account that the user is subscribing to may be referred to as "following", another user account that is subscribing to the user may be referred to as "follower", and data (e.g., postings, driving routes) continuously received from another user account that the user is subscribing to may be referred to as a "feeds".

FIG. 1 is a diagram illustrating an example in which a user 110 uses a navigation service based on user driving route by using a user terminal 120. The user 110 may be provided with one or more user driving routes and user driving route information through the user terminal 120. In this case, the user driving route may include a driving route registered by a user account associated with the user terminal 120 and/or a driving route registered by a user account associated with another user terminal. In addition, the user driving route information may include metadata (e.g., a hashtag associated with a place and the like) associated with a departure point, one or more stopovers, a destination, and a driving route.

At first and second operations 130 and 140, the user 110 may select one user driving route on a user driving route search screen 132, and enter an information screen 142 of the selected user driving route to store/edit the driving route, or be provided with a driving guidance service for the selected user driving route.

Specifically, the first operation 130 shows an example in which, in response to the user 110 inputting a metadata search term associated with the driving route on the user driving route search screen 132, one or more user driving routes are output. The user terminal 120 may output one or more user driving routes 136 associated with the metadata search term in response to a user input including a metadata search term 134. In this case, the metadata search term 134 may include a hashtag associated with a place or a search term associated with a driving route. For example, as illustrated, the user terminal 120 may output one or more user driving routes 136 associated with a "day trip" in response to a user input including the metadata search term 134 such as "day trip". The user driving route 136 may include a departure point, a destination, the number of stopovers, a required time, and a recommendation index. However, example embodiments are not limited thereto. The recommendation index may be calculated based on an evaluation score input for each user driving route from the user account associated with the user terminal and/or another user terminal.

The user 110 may enter the user driving route information screen 142 with a user input 138 of touching a detail view icon of a user driving route 136 from among the one or more user driving routes.

The second operation 140 shows an example in which the user driving route information screen 142 associated with the driving route selected by the user is output. For example, as illustrated, the user terminal 120 may output the user driving route information selected by the user 110, such as "departure point: Seoul", "first stopover: Mt. Cheonma", "second stopover: Gapyeong", "Destination: Chuncheon", for example. In addition, the user terminal 120 may output a hashtag associated with the selected driving route, such as "#day trip", "#breakfast available", for example, and output search data associated with the driving route, such as "rest" and "refresh", for example. In addition, with a user input 149 of touching a driving start icon, the user 110 may be provided with a driving guidance service on the selected user driving route.

The user 110 may change the selected user driving route and provided with the driving guidance service. Specifically, the user 110 may select an edit icon 148 to change one or more of the user driving route information, and the user terminal 120 may output a required time 144 of the changed driving route together with the changed user driving route information. For example, the user 110 may change the first stopover from "Mt. Cheonma" to "Cheongpyeong". In this case, the user terminal 120 may output the required time of the driving route that includes the first stopover changed to "Cheongpyeong". With the user input 149 of touching the driving start icon, the user 110 may be provided with the driving guidance service on the changed user driving route.

Additionally, the user 110 may store the changed driving route information. Specifically, the user 110 may select a route storage icon 146 to register the changed user driving route. For example, the user 110 may touch the route storage icon 146 to register the driving route including the first stopover changed to "Cheongpyeong".

With the configuration described above, the user 110 is able to search one or more user driving routes registered by the user or another user by using the metadata search term, and select from them a driving route that suits the user and be provided with the driving guidance service. In addition, the user 110 may edit a pre-registered user driving route and register it as a new user driving route, and edit the registered user driving route and provided with the driving guidance service on the new user driving route. In addition, if the user is traveling a new area for the first time, the user 110 may search with a metadata associated with the driving route to be provided with user-customized driving guidance information.

Figure 2:
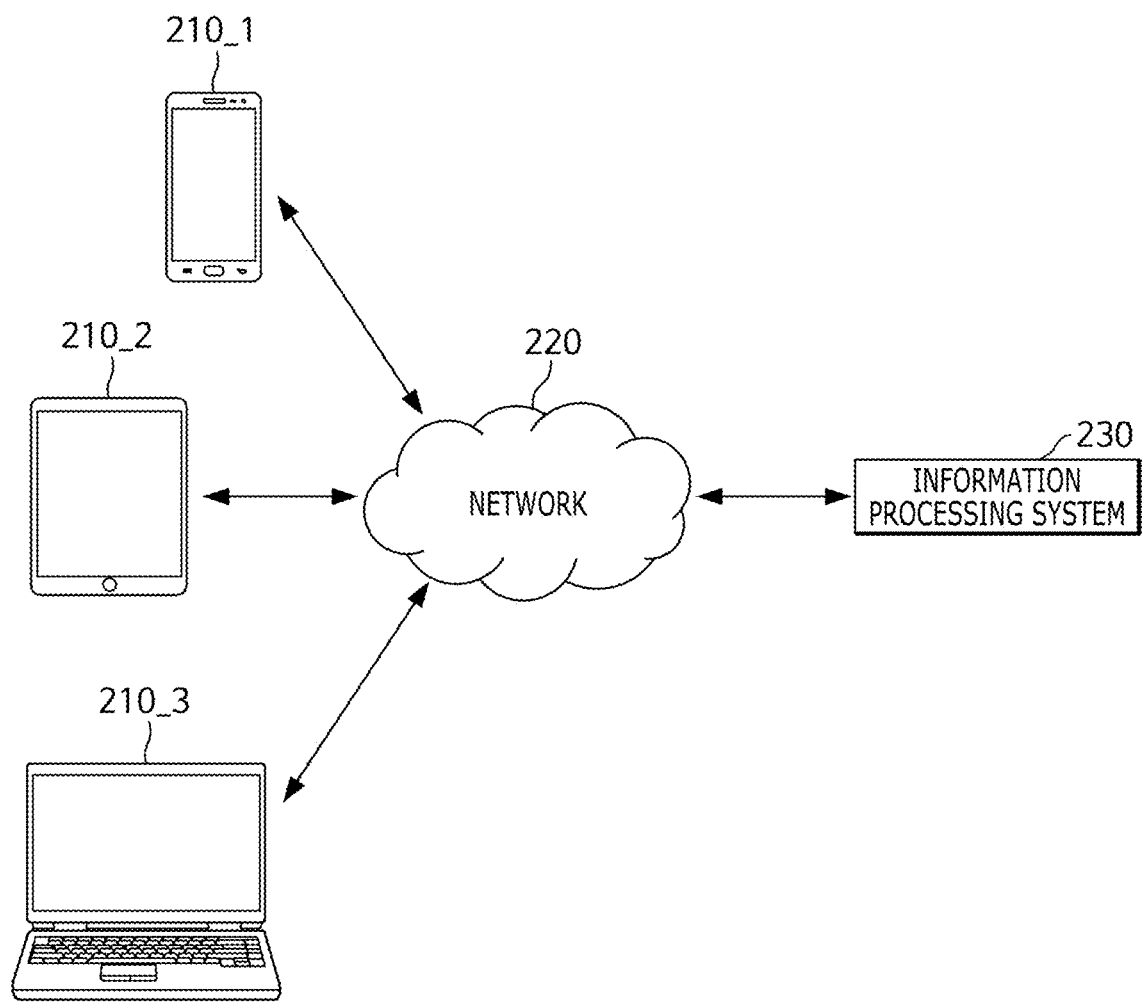
FIG. 2 is a schematic diagram illustrating a configuration in which an information processing system is communicatively connected to a plurality of user terminals in order to provide a driving guidance service based on user driving route.

FIG. 2 is a schematic diagram illustrating a configuration in which an information processing system 230 is communicatively connected to a plurality of user terminals 210_1, 210_2, and 210_3 to provide a driving guidance service based on user driving route. The information processing system 230 may include a system capable of providing a driving guidance service based on user driving route to the plurality of user terminals 210_1, 210_2, and 210_3 through a network 220. The information processing system 230 may include one or more server devices and/or databases, or one or more distributed computing devices and/or distributed databases based on cloud computing services that can store, provide and execute computer-executable programs (e.g., downloadable applications) and data related to the driving guidance service based on user driving route. For example, the information processing system 230 may include separate systems (e.g., servers) for the driving guidance service based on user driving route. The driving guidance service based on user driving route provided by the information processing system 230 may be provided to the user through processing circuitry executing a driving guidance application installed in each of the plurality of user terminals 210_1, 210_2, and 210_3.

The plurality of user terminals 210_1, 210_2, and 210_3 may communicate with the information processing system 230 through the network 220. The network 220 may be configured to enable communication between a plurality of user terminals 210 and the information processing system 230. The network 220 may be configured as a wired network 220 such as Ethernet, a wired home network (Power Line Communication), a telephone line communication device and RS-serial communication, a wireless network 220 such as a mobile communication network, a wireless LAN (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, and the like) that may be included in the network 220 as well as short-range wireless communication between the user terminals 210_1, 210_2, and 210_3, but aspects are not limited thereto. For example, the network 220 may include any one or more of networks including a personal area network (PAN), a local area network (LAN), a campus area network (CAN), a metropolitan area network (MAN), a wide area network (WAN), a broadband network (BBN), the Internet, and the like. In addition, the network 220 may include any one or more of network topologies including a bus network, a star network, a ring network, a mesh network, a star-bus network, a tree or hierarchical network, and the like, but not limited thereto.

In FIG. 2, a mobile phone terminal 210_1, a tablet terminal 210_2, and a PC terminal 210_3 are illustrated as the examples of the user terminals, but are not limited thereto, and the user terminals 210_1, 210_2, and 210_3 may be any computing device that is capable of wired and/or wireless communication and that can be installed with the driving guidance application and execute the same. For example, the user terminal may include a smartphone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, while FIG. 2 illustrates three user terminals 210_1, 210_2, and 210_3 in communication with the information processing system 230 through the network 220, the aspects are not limited thereto, and accordingly, a different number of the user terminals 210_1, 210_2, and 210_3 may be configured to be in communication with the information processing system 230 through the network 220.

The information processing system 230 may receive request information for user driving route including the metadata search term from the user terminals 210_1, 210_2, and 210_3, and transmit the user driving route associated with the metadata search term to the user terminals 210_1, 210_2, and 210_3. In addition, the information processing system 230 may receive request information for driving guidance based on user driving route from the user terminals 210_1, 210_2, and 210_3, and transmit the driving guidance information for the corresponding driving route to the user terminals 210_1, 210_2, and 210_3. The user terminals 210_1, 210_2, and 210_3 may output the user driving route and the driving guidance information associated with the received metadata search term.

Figure 3:
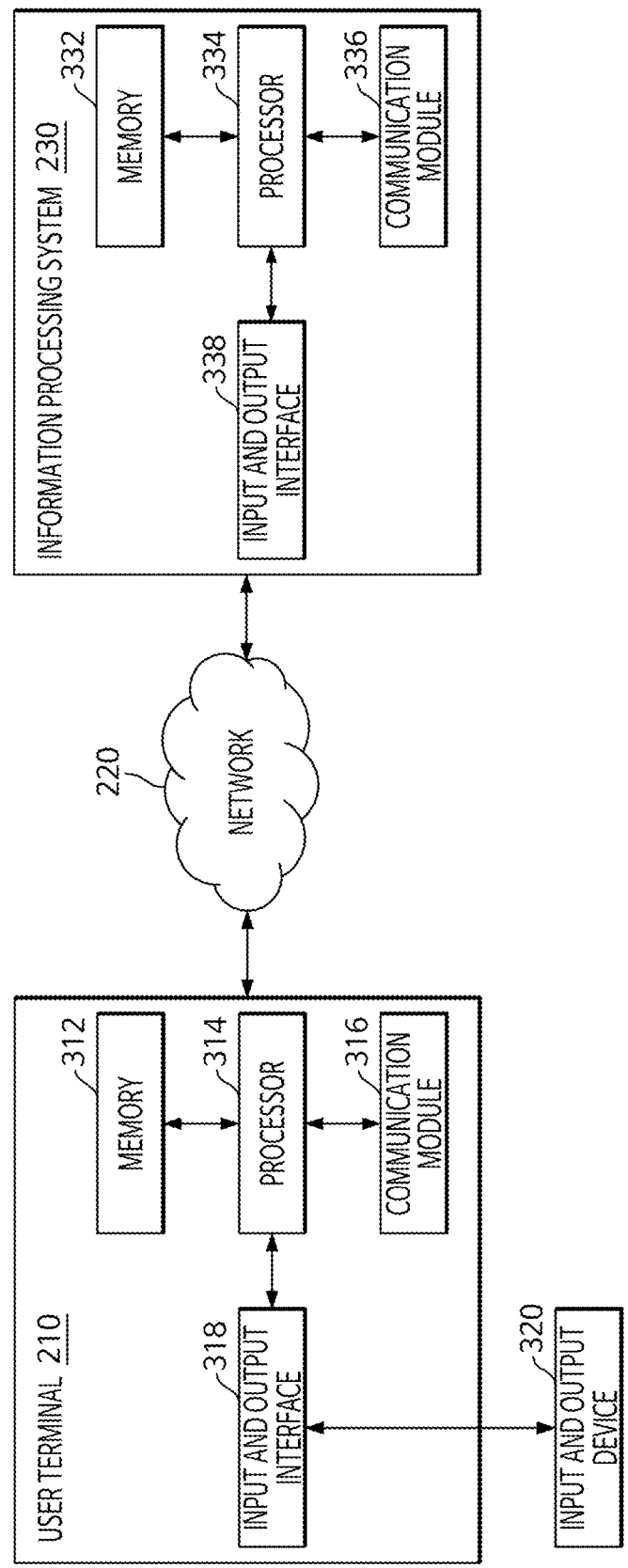
FIG. 3 is a block diagram illustrating an internal configuration of the user terminal and the information processing system.

FIG. 3 is a block diagram illustrating an internal configuration of the user terminal 210 and the information processing system 230. The user terminal 210 may refer to any computing device that is capable of executing the driving guidance application and capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using respective communication modules 316 and 336. In addition, an input and output device 320 may be configured to input information and/or data to the user terminal 210 or output information and/or data generated from the user terminal 210 through the input and output interface 318.

The memories 312 and 332 may include any non-transitory computer-readable recording medium. The memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and at least one program code (e.g., a code for an application and the like associated with the driving guidance service installed and driven in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules rather than the computer-readable recording medium. For example, at least one program may be loaded into the memories 312 and 332 based on a computer program (e.g., an application associated with the driving guidance service) installed by files provided by the developers or a file distribution system for distributing an installation file of the application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

For example, through the execution of the instructions, the processors 314 and 334 may be transformed into special purpose processors to provide a user of a user terminal with navigation guidance based on user navigation routes such that, for example, another user associated with a different user terminal may be authorized to change the navigation route including adding or changing a stopover while the user terminal is transmitting navigation guidance information to the user terminal and/or allow the user to select high valued navigation routes from among ranked navigation routes published by subscribed users. Therefore, the special purpose processors may improve the functioning of the navigation system itself.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request (e.g., the request information for driving guidance based on user driving route) generated by the processor 314 of the user terminal 210 according to the program code stored in the recording device such as the memory 312 or the like may be transmitted to the information processing system 230 through the network 220 under the control of the communication module 316. Conversely, a control signal or a command provided under the control of the processor 334 of the information processing system 230 may be received by the user terminal 210 through the communication module 316 of the user terminal 210 through the communication module 336 and the network 220. For example, the user terminal 210 may receive the driving guidance information from the information processing system 230 through the communication module 316.

The input and output interface 318 may be a means for interfacing with the input and output device 320. As an example, the input device may include a device such as a camera including an image sensor, a keyboard, a microphone, a mouse, and so on, and the output device may include a device such as a display, a speaker, a haptic feedback device, and so on. As another example, the input and output interface 318 may be a means for interfacing with a device integrating inputting and outputting configurations or functions, such as a touch screen or the like. For example, if the processor 314 of the user terminal 210 processes the instructions of the computer program loaded in the memory 312, a service screen, which is configured with the information and/or data provided by the information processing system 230 or other user terminals 210, may be displayed on the display through the input and output interface 318. While FIG. 3 illustrates that the input and output device 320 is not included in the user terminal 210, aspects are not limited thereto, and an input and output device may be configured as one device with the user terminal 210. In addition, the input and output interface 338 of the information processing system 230 may be a means for interface with a device (not illustrated) for inputting or outputting that may be connected to, or included in the information processing system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. The user terminal 210 may be implemented to include at least a part of the input and output device 320 described above. In addition, the user terminal 210 may further include other components such as a transceiver, a Global Positioning System (GPS) module, a camera, various sensors, a database, and the like. For example, if the user terminal 210 is a smartphone, it may include components generally included in the smartphone. For example, in an implementation, various components such as an acceleration sensor, a gyro sensor, a camera module, various physical buttons, buttons using a touch panel, input and output ports, a vibrator for vibration, and so on may be further included in the user terminal 210.

The processor 314 of the user terminal 210 may be configured to operate the driving guidance application or a web browser application. In this case, a program code associated with the above application may be loaded into the memory 312 of the user terminal 210. While the application is running, the processor 314 of the user terminal 210 may receive information and/or data provided from the input and output device 320 through the input and output interface 318 or receive information and/or data from the information processing system 230 through the communication module 316, and process the received information and/or data and store it in the memory 312. In addition, such information and/or data may be provided to the information processing system 230 through the communication module 316.

While the driving guidance application is running, the processor 314 may receive voice data, text, image, video, and the like input or selected through the input device such as a camera, a microphone, and the like that includes a touch screen, a keyboard, an audio sensor and/or an image sensor connected to the input and output interface 318, and store the received voice data, text, image, and/or video or the like in the memory 312, or provide it to the information processing system 230 through the communication module 316 and the network 220. The processor 314 of the user terminal 210 may transmit and output the information and/or data to the input and output device 320 through the input and output interface 318. For example, the processor 314 of the user terminal 210 may output the processed information and/or data through the output device 320 such as a device capable of outputting a display (e.g., a touch screen, a display, and the like), a device capable of outputting a voice (e.g., speaker), and the like.

The processor 314 of the user terminal 210 may be configured to manage, process, and/or store the information and/or data received from the input and output device 320, another user terminal, the information processing system 230 and/or a plurality of external systems. The information and/or data processed by the processor 314 may be provided to the information processing system 230 through the communication module 316 and the network 220. The processor 314 of the user terminal 210 may transmit the information and/or data to the input and output device 320 through the input and output interface 318 to output the same. For example, the processor 314 may display the received information and/or data on a screen of the user terminal.

The processor 334 of the information processing system 230 may be configured to manage, process, and/or store information and/or data received from the plurality of user terminals 210 and/or a plurality of external systems. The information and/or data processed by the processor 334 may be provided to the user terminals 210 through the communication module 336 and the network 220.

Figure 4:
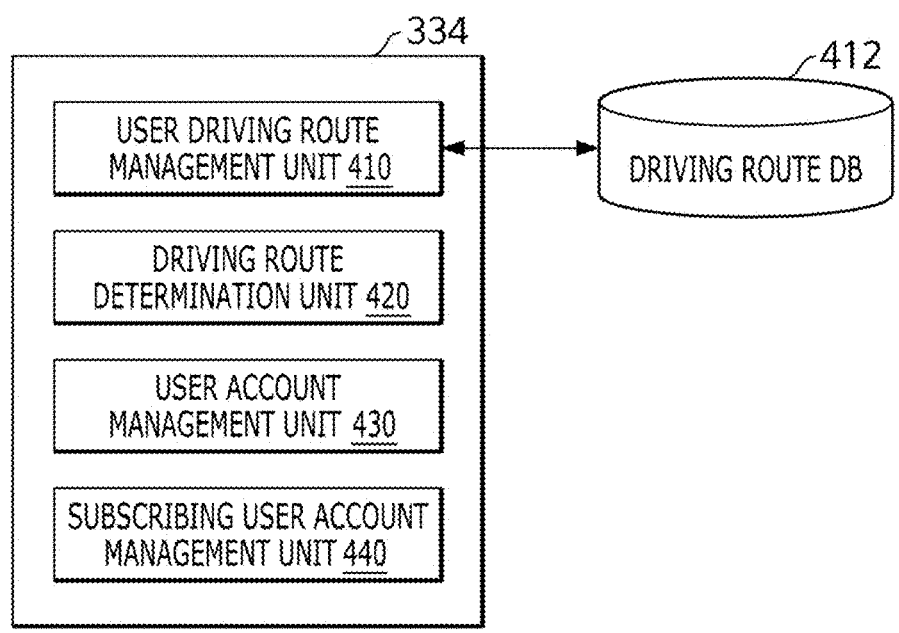
FIG. 4 is a block diagram illustrating an internal configuration of a processor.

FIG. 4 is a block diagram illustrating an internal configuration of the processor 334. As illustrated, the processor 334 may execute software that configures the processor 334 to perform the operations of a user driving route management unit 410, a driving route determination unit 420, a user account management unit 430, and a subscribing user account management unit 440. While only one processor is illustrated in FIG. 4, aspects are not limited thereto, and there may be a plurality of processors.

The user driving route management unit 410 may receive the request information for driving route including the metadata search term, and transmit one or more user driving routes associated with the metadata search term to the user terminal. In this case, the one or more user driving routes associated with the metadata search term may refer to driving routes previously stored in a driving route DB 412.

In addition, the user driving route management unit 410 may receive request information for a user driving route from among the one or more user driving routes, and transmit the selected user driving route information to the user terminal. The user driving route information may include a departure point, one or more stopovers and a destination associated with the user driving route, metadata associated with the driving route, and a required time.

Additionally, the user driving route management unit 410 may receive a user input associated with the user driving route information, and store or register the user driving route information in the driving route DB 412. The user driving route information may include a driving route including a departure point, one or more stopovers and a destination, and metadata associated with the driving route.

The user driving route management unit 410 may receive a user input of changing the user driving route information, and store the changed user driving route information in the driving route DB 412. In this case, the changed user driving route information may be stored in association with the user account requesting the change. For example, if user "B" changes the driving route information registered by user "A" and stores the changed driving route information, the changed user driving route information may be stored in the driving route DB 412 as the user driving route information registered by user "B".

In addition, the user driving route management unit 410 may receive an evaluation score associated with the user driving route and store the received evaluation score in the driving route DB 412. In addition, the user driving route management unit 410 may determine a recommendation index based on the evaluation score associated with the driving route and store the determined recommendation index in the driving route DB 412. Additionally, the user driving route management unit 410 may receive an evaluation score associated with a stopover included in the user driving route and store the received evaluation score in the driving route DB 412. In addition, the user driving route management unit 410 may determine a recommendation index based on the evaluation score associated with the stopover and store the determined recommendation index in the driving route DB 412.

The driving route determination unit 420 may receive request information for driving guidance of user driving route and transmit, to the user terminal, the driving guidance information according to the selected user driving route. While transmitting the driving guidance information according to the selected user driving route, the driving route determination unit 420 may transmit a recommended stopover to the user terminal to change to a new driving route. For example, the driving route determination unit 420 may determine the recommended stopover in association with the driving time (e.g., dinner time-zone, and the like) or with the driving time period (e.g., 2 hours since departure), and transmit a message including the recommended stopover to the user terminal. In another example, the driving route determination unit 420 may determine a recommended stopover in association with a place or location on the road (e.g., close restaurants, lodging facilities, and the like), and transmit a message including the recommended stopover to the user terminal. Additionally, the driving route determination unit 420 may receive information for selecting the recommended stopover, and transmit driving guidance information according to the new driving route to the user terminal.

While transmitting the driving guidance information according to the selected user driving route, the driving route determination unit 420 may transmit a driving route shared by another user to the user terminal. As used herein, "another user" may refer to a user account associated with another user terminal that is authorized to change driving route by the user account associated with the user terminal. For example, the driving route determination unit 420 may receive, from the user account authorized to change the driving route, a driving route including the added/changed stopover, and transmit, to the user terminal receiving the driving guidance information, a message regarding whether or not to change the driving route. Additionally, the driving route determination unit 420 may receive information for selecting the changed driving route and transmit the driving guidance information according to the new driving route to the user terminal.

For example, the primary user may be a driver of a vehicle whose user terminal is connected to an in-vehicle entertainment system that is configured to receive visual and/or audio guidance from the user terminal of the driver, and the another user may be one of more passengers within the vehicle that are authorized to change the driving route including adding or changing a stopover while the user terminal is transmitting the driving guidance information according to the selected user driving route. However, example embodiments are not limited thereto.

Therefore, the special purpose processors included in the user terminal 210 and the information processing system 230 may improve the functioning of navigation guidance by allowing users other than the driver to change the navigation route by adding or changing a stopover through their own user terminal while allowing the driver to focus their attention on driving the vehicle and without having to provide the passenger with physical access to their user terminal.

The user account management unit 430 may store, change, or delete the user account information associated with the user terminal. In this case, the user account information may include user identification information (e.g., name, contact information, email, and the like), and information on friend relationship with a user account associated with another user terminal. In addition, the friend relationship information may be generated based on the contact information stored in the user terminal or generated based on information input from the user account associated with the user terminal.

The user driving route management unit 410 may receive the friend relationship information from the user account management unit 430 and transmit the user driving route registered by a user account in the friend relationship to the user terminal. For example, if the user driving route management unit 410 receives a request to output driving route of a "friend" from the user terminal, the user driving route management unit 410 may transmit the user driving route registered by the user account in friend relationship to the user terminal based on the friend relationship information received from the user account management unit 430.

The subscribing user account management unit 440 may store or change subscription state information of a user account associated with another user terminal. For example, the subscribing user account management unit 440 may receive request information for subscribing to a user account associated with another user terminal, and store "subscribing" for the subscription state information. In addition, the subscribing user account management unit 440 may receive the request information for unsubscribing from the subscribed user account, and change the subscription state information to "unsubscribed".

The user driving route management unit 410 may receive the subscription state information from the subscribing user account management unit 440 and transmit the user driving route registered by the subscribed user account to the user terminal. For example, if the user driving route management unit 410 receives request information for driving route registered by the subscribed user account, the user driving route management unit 410 may transmit the user driving route registered by the subscribed user account to the user terminal based on the subscription state information received from the subscribing user account management unit 440.

The internal configuration of the processor 334 illustrated in FIG. 4 is only an example, and in some examples, configurations other than the illustrated internal configuration may be additionally included, or some configurations may be omitted, and some processes may be performed by other configurations or external systems.

Figure 5:
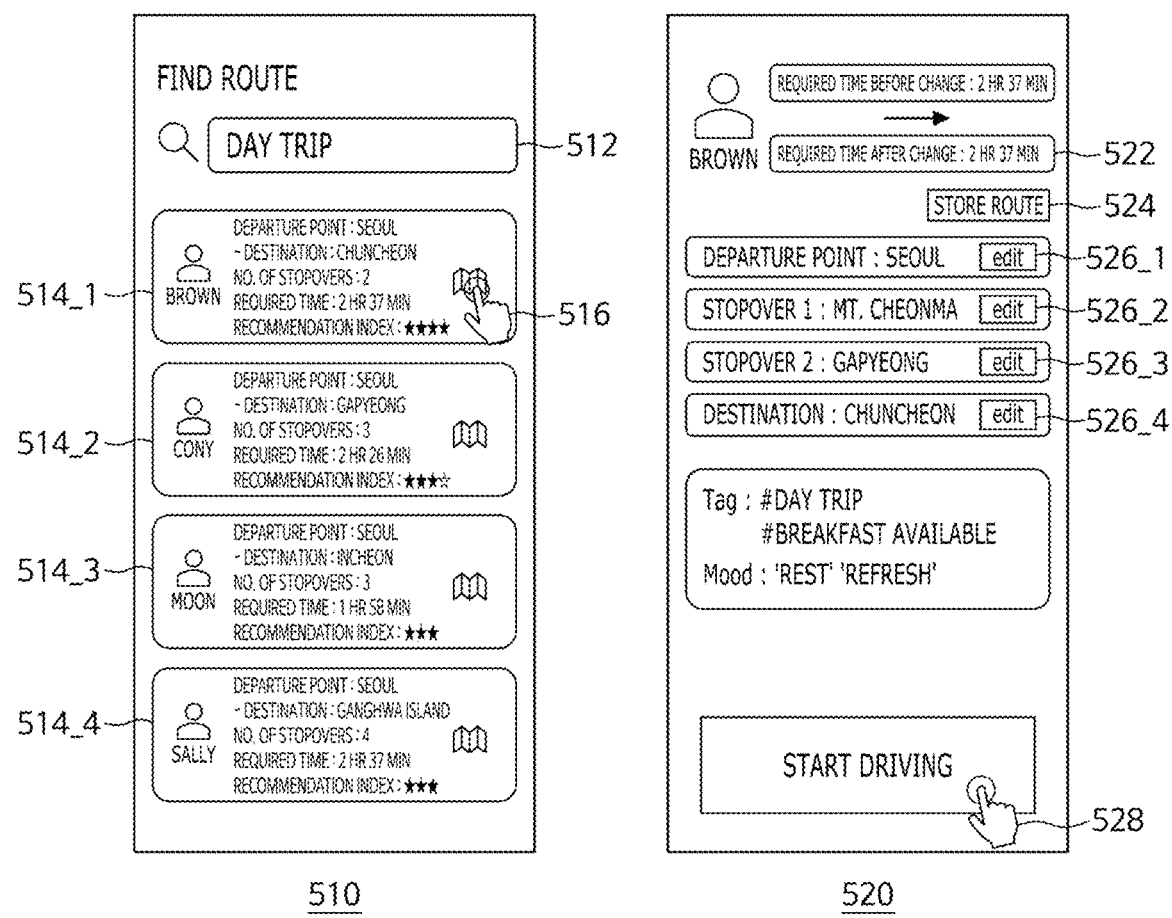
FIG. 5 is a diagram illustrating an example in which a user driving route associated with metadata is searched and selected, and the selected user driving route information is output.

FIG. 5 is a diagram illustrating an example in which a user driving route associated with metadata is searched and selected, and the selected user driving route information is output.

Referring to FIG. 5, at first and second operations 510 and 520, the user may select a user driving route (e.g., 514_1) from among the one or more user driving routes 514_1, 514_2, 514_3, and 514_4 output by the user terminal and be provided with the driving guidance service for the selected user driving route. In addition, through the user terminal, the user may change and store the selected driving route, or be provided with the driving guidance service of the changed user driving route.

Specifically, the first operation 510 shows an example in which the user terminal outputs the one or more user driving routes 514_1, 514_2, 514_3, and 514_4 if the user inputs a metadata search term 512 associated with the driving route. In response to a user input including the metadata search term 512, the processor of the user terminal may output the one or more user driving routes 514_1, 514_2, 514_3, and 514_4 associated with the metadata search term. In this case, the metadata search term 512 may include a hashtag associated with a place or a search term associated with the driving route.

The one or more user driving routes 514_1, 514_2, 514_3, and 514_4 may include driving routes registered by a user account associated with one or more user terminals. For example, as illustrated, each of the one or more user driving routes 514_1, 514_2, 514_3, and 514_4 may represent driving routes registered by each of the user accounts associated with "Brown", "Connie, "Moon", and "Sally" in association with "day trip" which is a metadata search term.

In addition, the one or more user driving routes 514_1, 514_2, 514_3, and 514_4 may include information such as a departure point, a destination, the number of stopovers, a required time, a recommendation index, and the like. In this case, the recommendation index may be calculated based on the evaluation score input for each user driving route by the user account associated with the user terminal and/or another user terminal. For example, the user driving route 514_1 registered by the user account associated with "Brown" may include information such as "Departure point: Seoul", "Destination: Chuncheon", "Number of stopovers: 2", "Required time: 2 hours 37 minutes", "Recommended index: ★★★★", and the like. In response to an input of the metadata search term 512 associated with the user driving route, the processor may sort the one or more user driving routes 514_1, 514_2, 514_3, and 514_4 in the order of the highest recommendation index and output the result.

Although not illustrated, in addition to the number of stopovers in each user driving route, the type of the stopover (e.g., cafe, gas station, restaurant), or additional information on the stopover (e.g., sights, food), or the like may be displayed in the form of text, images, or the like.

Additionally, the one or more user driving routes 514_1, 514_2, 514_3, and 514_4 output in response to the user input including the metadata search term 512 may include a user driving route registered by a user account that is a "friend". In this case, the user driving route registered by the user account that is a "friend" may be output to an area separated from the other user driving routes 514_1, 514_2, 514_3, and 514_4 registered by a user account that is not a "friend". For example, the user driving route registered by the user account that is a "friend" may be output on an upper part of the screen, and another user driving route registered by the user account that is not a "friend" may be output on a lower part of the screen.

The second operation 520 shows an example in which the user driving route information associated with the driving route selected by the user is output. The processor may output the selected user driving route information in response to a user input 516 of touching a detailed information view icon of a user driving route from among the one or more user driving routes 514_1, 514_2, 514_3, and 514_4. In this case, the user driving route information associated with the driving route selected by the user may include a departure point, one or more stopovers, a destination, a hashtag associated with the driving route, a search term associated with the driving route, and a required time. For example, as illustrated, the user driving route information may include "Departure point: Seoul", "First stopover: Mt. Cheonma", "Second stopover: Gapyeong", "Destination: Chuncheon", and may include "#day trip" and "#breakfast available", which are hashtags associated with the driving route, and "rest" and "refresh" which are search data associated with the driving route.

In response to receiving the user input of changing the driving route information, the processor may output the changed user driving route information. Specifically, if the processor receives a user input of touching edit icons 526_1, 526_2, 526_3, and 526_4 for changing a departure point, one or more stopovers, or a destination, the processor may output user driving route information including at least one of the changed departure point, one or more stopovers, or destination. In this case, in order to compare the required times before and after the change, the processor may output a required time of the user driving route before the change and a required time 522 of the user driving route after the change together.

The user may select, through the user terminal, a route storage icon to store the changed user driving route. For example, the processor of the user terminal may receive a user input of changing the first stopover from "Mt. Cheonma" to "Cheongpyeong", and output the user driving route information including the first stopover changed to "Cheongpyeong". In addition, if the processor receives a user input of touching a route storage icon 524, the processor may store the driving route including the first stopover changed to "Cheongpyeong" in the database.

Through the user terminal, the user may be provided with a driving guidance for the selected/changed user driving route. For example, if the processor receives a user input of touching a driving start icon 528, the processor may provide a driving guidance service for the selected/changed user driving route.

Figure 6:
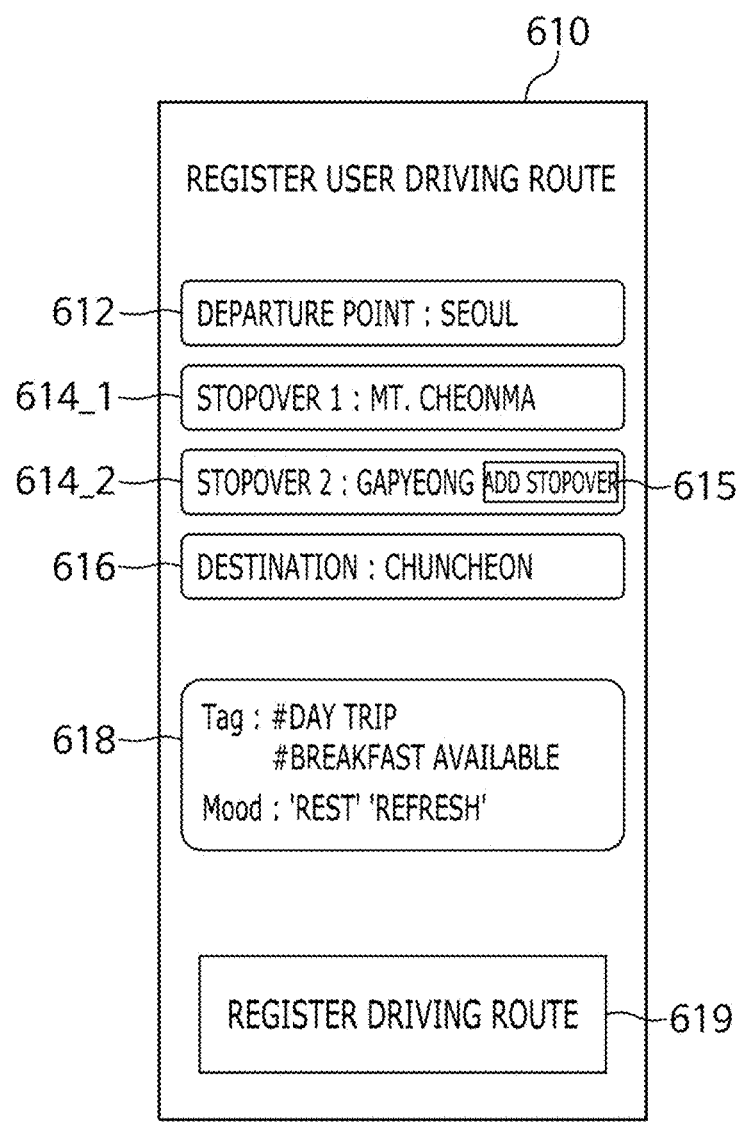
FIG. 6 is a diagram illustrating an example in which a user driving route is registered.

FIG. 6 is a diagram illustrating an example in which the user driving route is registered.

Referring to FIG. 6, the user may input and register the user driving route information through a user driving route registration screen 610 that is output by the user terminal. Specifically, the processor of the user terminal may receive a user input associated with user driving route information. The user driving route information may include a departure point 612, one or more stopovers 614_1 and 614_2, a destination 616, and metadata 618 associated with the driving route (e.g., a hashtag associated with the driving route, and search data associated with the driving route). For example, as illustrated, the processor may receive a user input such as "Seoul" for the departure point 612, "Chunmasan" for the first stopover 614_1, "Gapyeong" for the second stopover 614_2, and "Chuncheon" for the destination 616, and as the metadata 618 associated with the driving route, "#day trip", "#breakfast available" for the hashtag associated with the driving route, and "rest" and "refresh" for the search data associated with the driving route. In response to the user input of touching a driving route registration icon 619, the processor may store the user driving route information in the database.

FIG. 6 illustrates that two stopovers are included in the user driving route information, but aspects are not limited thereto, and the user driving route information may include two or more stopovers. For example, the processor may additionally output an input window for inputting a stopover in response to a user input of touching a stopover add icon 615.

Figure 7:
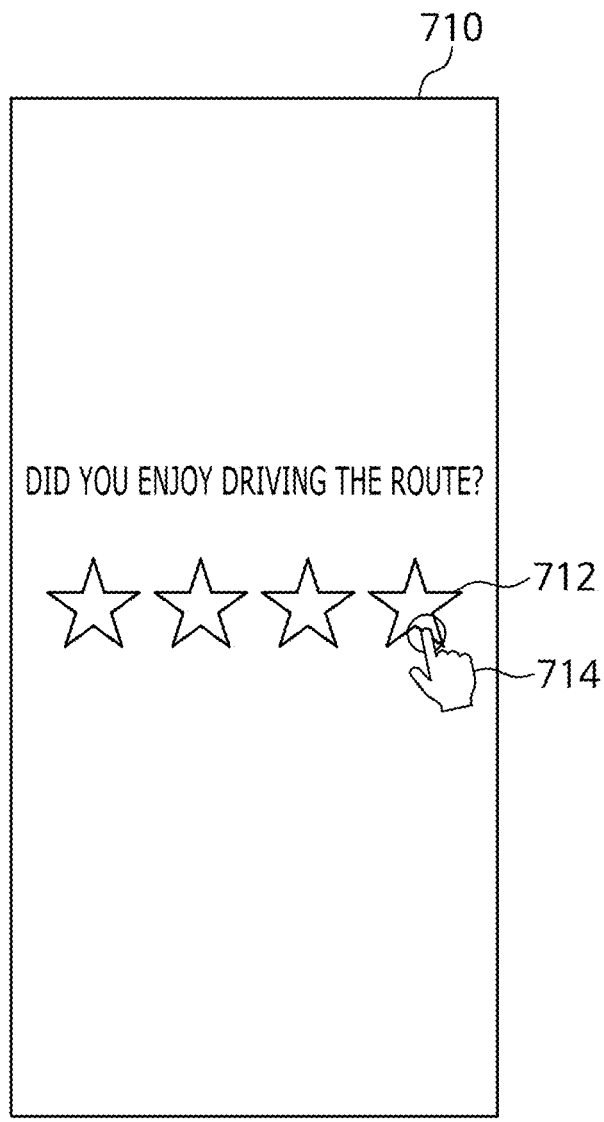
FIG. 7 is a diagram illustrating an example in which an evaluation score of a user driving route is input by a user.

FIG. 7 is a diagram illustrating an example in which an evaluation score of the user driving route is input by the user.

Referring to FIG. 7, upon finishing driving according to the selected user driving route, the user may input an evaluation score for the selected user driving route on an evaluation score input screen 710 output by the user terminal. Specifically, upon finishing driving according to the user driving route selected by the user, the processor of the user terminal may output the evaluation score input screen 710 through which an evaluation score for the user driving route can be input. The evaluation score input screen 710 may include an evaluation score input window (or, alternatively, an evaluation score input icon) 712.

The processor may receive a user input 714 of inputting the evaluation score into the evaluation score input window 712, and store, in the database, the input evaluation score in association with the selected user driving route. Additionally, the processor may calculate a recommendation index associated with the corresponding user driving route based on the evaluation score input from the user accounts associated with the plurality of user terminals, and store the calculated recommendation index in the database.

Although FIG. 7 illustrates the evaluation score input window 712 as an input window into which star points can be input, aspects are not limited thereto, and the evaluation score input window 712 may be output as the evaluation score input window with various other methods. In addition, the evaluation score input window 712 may be configured as a window or interactive icon for inputting content of evaluation. In this case, the input for the evaluation may be made in various forms such as text, images, and the like, and additional information on the user driving route may be input using a hashtag.

Figure 8:
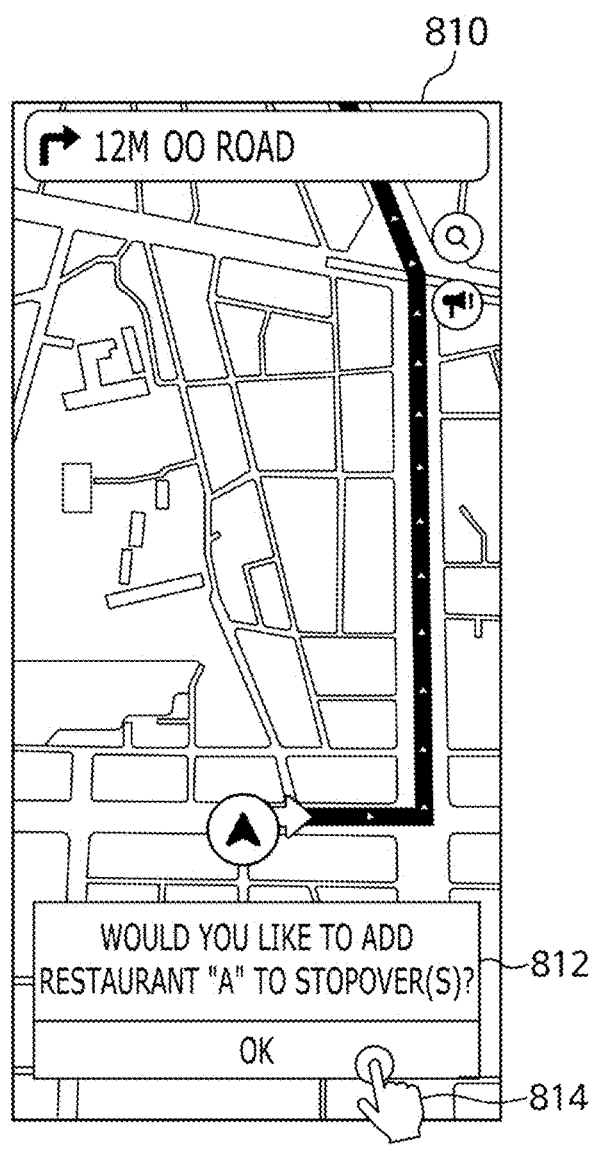
FIG. 8 is a diagram illustrating an example in which a stopover recommendation message is output while the driving guidance information for the selected user driving route is being provided.

FIG. 8 is a diagram illustrating an example in which a stopover recommendation message 812 is output while the driving guidance information for the selected user driving route is being provided.

Referring to FIG. 8, while the driving guidance information according to the user driving route selected by the user is being provided, the processor may output the stopover recommendation message 812 for changing to a new driving route, on a driving guidance information providing screen 810. While the driving guidance information according to the user driving route selected by the user is being provided, the processor may output the stopover recommendation message 812 associated with the current time (e.g., dinner time-zone, and the like) or with the driving time period (e.g., 2 hours since departure, and the like). According to another example, while the driving guidance information according to the user driving route selected by the user is being provided, the processor may output the stopover recommendation message 812 associated with a place or location on the road (e.g., close restaurants, lodging facilities, and the like). For example, as illustrated, while the driving guidance information is being provided, the processor may output the stopover recommendation message 812 such as "Would you like to add restaurant A to the stopover?" in association with the current time, driving time period, or driving place/position.

In response to a user input 814 for adding a stopover, the processor may output the driving guidance information changed to the new driving route. For example, in response to the user input 814 of touching a confirmation icon in the stopover recommendation message 812, the driving guidance information changed to the new driving route may be output. FIG. 8 illustrates the user input 814 of touching a confirmation icon, but aspects are not limited thereto. For example, the processor may output driving guidance information changed to the new driving route in response to a user's voice of adding a recommended stopover.

Figure 9:
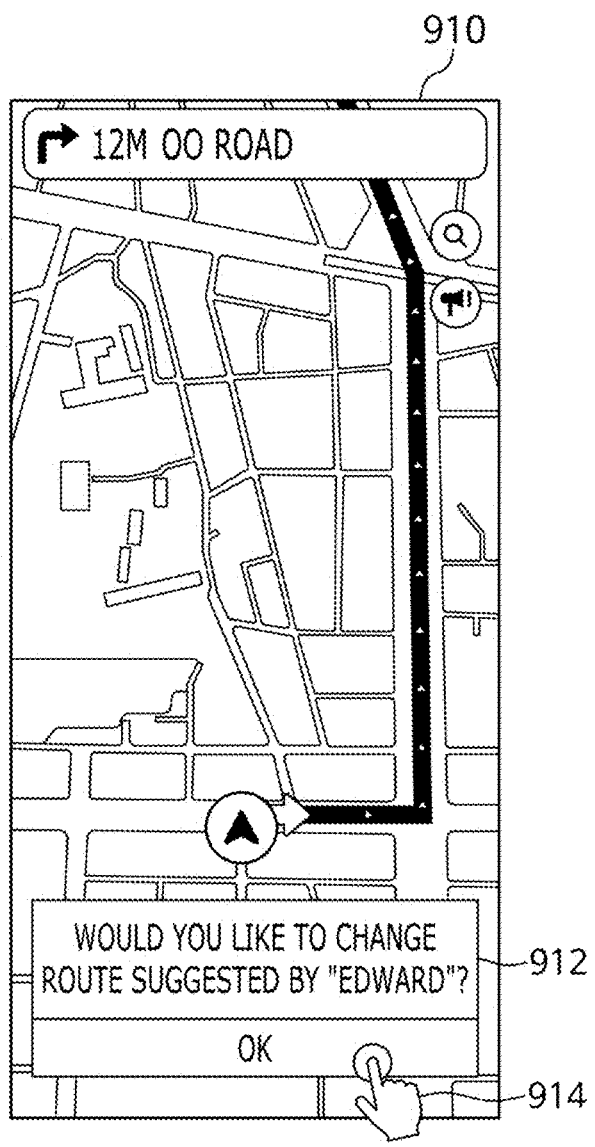
FIG. 9 is a diagram illustrating an example in which a driving route sharing message is output while the driving guidance information for the selected user driving route is being provided.

FIG. 9 is a diagram illustrating an example in which a driving route sharing message 912 is output while the driving guidance information for the selected user driving route is being provided.

Referring to FIG. 9, while the driving guidance information according to the user driving route selected by the user is being provided, the processor of the user terminal may output the driving route sharing message 912 of another user for changing to a new driving route on a driving guidance information providing screen 910. As used herein, "another user" may refer to a user account associated with another user terminal that is authorized to change driving route by the user account associated with the user terminal. For example, if the processor receives, from a user account (e.g., Edward) authorized to change the driving route, the request information for changing the driving route to a driving route including added/changed stopovers, the processor may output the driving route sharing message 912 such as "Would you like to change to the route suggested by Edward?" on the driving guidance information providing screen 910.

In response to a user input 914 for changing to the shared driving route, the processor may output driving guidance information changed to the new driving route. For example, in response to the user input 914 of touching a confirmation icon output together with the driving route sharing message 912, the processor may output the driving guidance information changed to the new driving route. FIG. 9 illustrates the user input 914 of touching the confirmation icon, but aspects are not limited thereto. For example, the processor may output the driving guidance information changed to the new driving route in response to a user's voice of changing to the shared driving route. In this case, the user input of changing to the shared driving route may be input while driving, but depending on user settings, it may be regarded as being automatically input before driving and/or upon meeting a specific condition.

Figure 10:
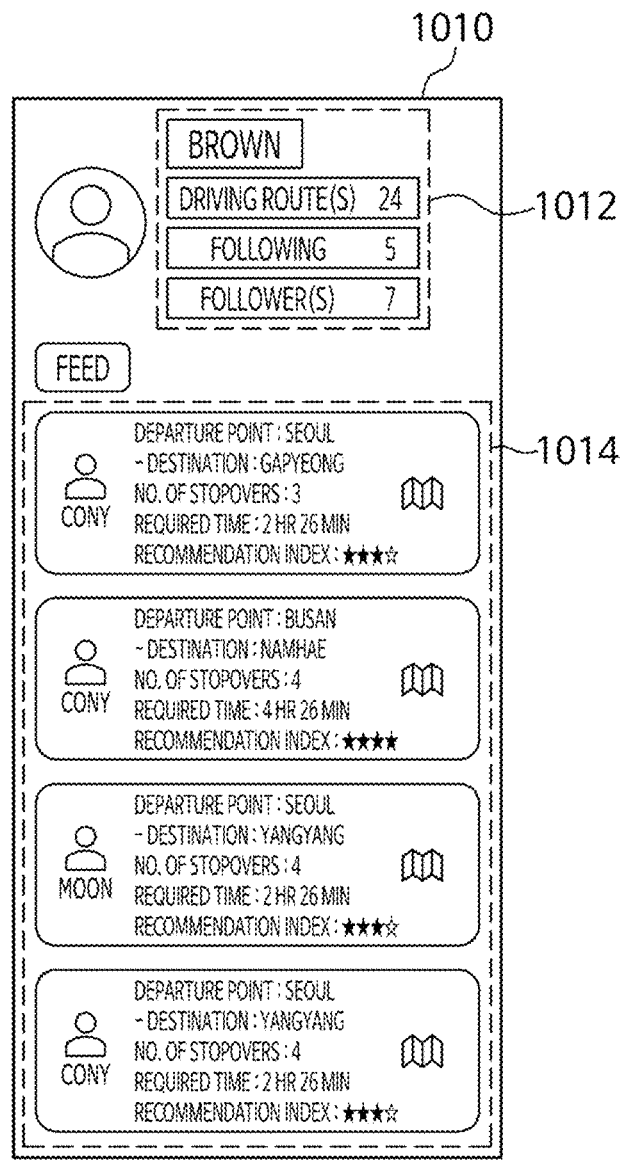
FIG. 10 is a diagram illustrating an example in which one or more user driving routes are output, in which the one or more user driving routes are generated by an account associated with another user terminal subscribed to by an account associated with the user terminal.

FIG. 10 is a diagram illustrating an example in which one or more user driving routes are output, in which the one or more user driving routes are generated by an account associated with another user terminal subscribed to by the account associated with the user terminal.

Referring to FIG. 10, the processor of the user terminal may output, on a subscription screen 1010, information 1012 associated with the subscription of the user account, and a subscribing driving route 1014. In this case, the information 1012 associated with the subscription of the user account may include information associated with the subscription of the user account, such as a nickname of the user account, the total number of driving routes received from the subscribed user account, the number of other user accounts subscribed to by the user account, and the number of other user accounts subscribing the user account. For example, as illustrated, the information 1012 associated with the subscription of the user account may be displayed on the subscription screen 1010, which may include "Brown", "Driving routes: 24", "Following: 5", and "Followers: 7".

In addition, the subscribing driving route 1014 may refer to one or more driving routes received from another user account subscribed to by the user account. For example, the processor may sort and output one or more driving routes registered by other user accounts (e.g., Cony, Moon) subscribed to by the user account (e.g., Brown) in the latest order. In this case, the subscribing driving routes 1014 may each include information such as a nickname of user account, a departure point, a destination, the number of stopovers, a required time, and a recommendation index. Additionally, in response to a user input of touching a detail view icon of each driving route, the processor may output a user driving route information screen (e.g., 142 of FIG. 1) associated with each driving route.

Figure 11:
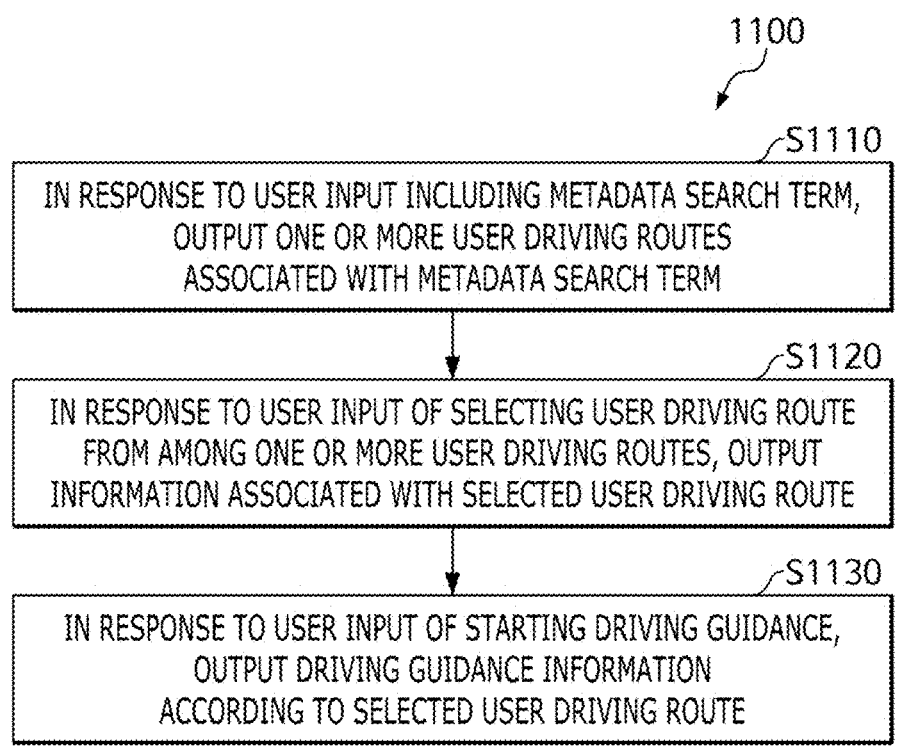
FIG. 11 is a flowchart illustrating a method for providing a navigation service based on user driving route.

FIG. 11 is a flowchart illustrating a method 1100 for providing a navigation service based on user driving route.

Referring to FIG. 10, in operation S1110, the processor may output one or more user driving routes associated with the metadata search term in response to a user input that includes the metadata search term. In this case, the metadata search term may include a hashtag associated with a place or a search term associated with the driving route. In addition, the one or more user driving routes associated with the metadata search term may each include a recommendation index determined based on the evaluation score associated with each of the user driving routes. The processor may sort and output one or more user driving routes in the order of the highest recommendation index.

Additionally, the processor may output a driving route that is associated with the metadata search term and a driving route that is stored by a user registered as a friend. In this case, the user driving route registered by the user account that is a "friend" may be output to an area separated from the user driving route associated with the metadata search term. For example, a user driving route registered by a user account that is a "friend" may be output on the upper part of the screen, and a user driving route associated with a metadata search term may be output on the lower part of the screen.

In operation S1120, in response to a user input of selecting a user driving route from among the one or more user driving routes, the processor may output information associated with the selected user driving route. In this case, the information associated with the selected user driving route may include a departure point, one or more stopovers and a destination associated with the selected user driving route, metadata associated with the driving route, and a required time.

Additionally, in response to a user input of changing at least one of the departure point, the one or more stopovers, or the destination, the processor may change and output the selected user driving route. In this case, the processor may output the changed required time together with the changed user driving route. The processor may receive a user input for storing the changed user driving route. In response to the user input, the processor may transmit the changed driving route information to an external device for storage in a database. In addition, in response to a user input of starting driving guidance, the processor may output the driving guidance information according to the changed user driving route.

In operation S1130, in addition to outputting the information associated with the selected user driving route, the processor may output driving guidance information according to the selected user driving route in response to a user input of starting driving guidance. Additionally, while outputting the driving guidance information according to the selected user driving route, the processor may output a recommended stopover for changing the selected user driving route to a new driving route. For example, the processor may output a recommended stopover determined in association with the current time or the driving time period. In another example, the processor may output a recommended stopover determined in association with the place or location on the road. Additionally or alternatively, while outputting the driving guidance information according to the selected user driving route, the processor may output driving routes shared by other users for changing the selected user driving route to a new driving route.

Additionally, if the driving guidance is completed, in response to a user input of inputting an evaluation score associated with the selected user driving route, the processor may transmit the evaluation score to an external device for storage in a database in association with the selected user driving route. The processor may calculate a recommendation index associated with the corresponding user driving route based on the evaluation score input from the user accounts associated with the plurality of user terminals, and store the calculated recommendation index in the database. Additionally or alternatively, if the driving guidance is completed, in response to a user input of inputting an evaluation score associated with the stopover included in the selected user driving route, the processor may transmit the evaluation score to an external device for storage in a database in association with the stopover.

Figure 12:
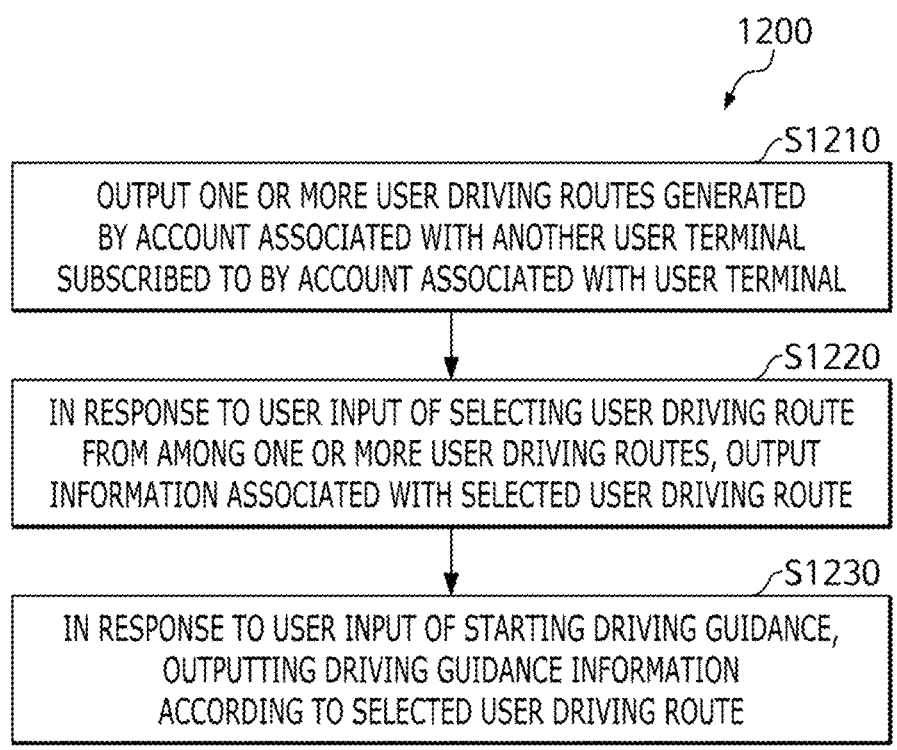
FIG. 12 is a flowchart illustrating a method for providing a navigation service based on user driving route.

FIG. 12 is a flowchart illustrating a method 1200 for providing a navigation service based on user driving route.

Referring to FIG. 12, in operation S1210, the processor may output one or more user driving routes generated by an account associated with another user terminal subscribed to by an account associated with the user terminal. In this case, the processor may output information associated with the subscription of the user account. The information associated with the subscription of the user account may include information such as a nickname of the user account, the total number of driving routes received from the subscribed user account, the number of other user accounts subscribed to by the user account, and the number of other user accounts subscribing the user account.

In operation S1220, in response to a user input of selecting a user driving route from among the one or more user driving routes, the processor may output information associated with the selected user driving route. In this case, the information associated with the selected user driving route may include a departure point, one or more stopovers and a destination associated with the selected user driving route, metadata associated with the driving route, and a required time.

Additionally, in response to a user input of changing at least one of the departure point, the one or more stopovers, or the destination, the processor may change and output the selected user driving route. In this case, the processor may output the changed required time together with the changed user driving route. The processor may receive a user input for storing the changed user driving route. In response to the user input, the processor may transmit the changed driving route information to an external device for storage in a database. In addition, in response to a user input of starting driving guidance, the processor may output the driving guidance information according to the changed user driving route.

In operation S1230, in addition to outputting the information associated with the selected user driving route, the processor may output driving guidance information according to the selected user driving route in response to a user input of starting driving guidance. Additionally, while outputting the driving guidance information according to the selected user driving route, the processor may output a recommended stopover for changing the selected user driving route to a new driving route. For example, the processor may output a recommended stopover determined in association with the current time or the driving time period. In another example, the processor may output a recommended stopover determined in association with the place or location on the road. Additionally or alternatively, while outputting the driving guidance information according to the selected user driving route, the processor may output driving routes shared by other users for changing the selected user driving route to a new driving route.

Therefore, the special purpose processors included in the user terminal 210 and the information processing system 230 may improve the functioning of navigation guidance by allowing users to gain subscribers based on, for example, the value of the navigation routes they add to the community, and for other users to have access to rankings of these navigation routes when planning a trip.

Additionally, if the driving guidance is completed, in response to a user input of inputting an evaluation score associated with the selected user driving route, the processor may transmit the evaluation score to an external device for storage in a database in association with the selected user driving route. The processor may calculate a recommendation index associated with the corresponding user driving route based on the evaluation score input from the user accounts associated with the plurality of user terminals, and store the calculated recommendation index in the database. Additionally or alternatively, if the driving guidance is completed, in response to a user input of inputting an evaluation score associated with the stopover included in the selected user driving route, the processor may transmit the evaluation score to an external device for storage in a database in association with the stopover.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method of providing navigation guidance based on user navigation routes to a user via a graphical user interface (GUI) of a user terminal, the user terminal including a display configured to display the GUI and one or more processors, the method comprising:

displaying, via the GUI, a user driving route search screen having a search box configured to receive a metadata search term and a results pane configured to display a result of a search inputted into the search box;

receiving, via the search box of the GUI, the metadata search term input by the user;

determining, one or more user navigation routes to provide to the user by instructing a server to search for hashtags associated with the one or more of the user navigation routes that correspond to the metadata search term and receiving, from the server, the one or more of the user navigation routes having the hashtags corresponding to the metadata search term input by the user;

outputting, via the results pane of the GUI, the one or more of the user navigation routes corresponding to the metadata search term;

modifying the GUI to display an information screen associated with a selected user navigation route, in response to the user inputting the selected user navigation route from among the one or more user navigation routes displayed on the results pane via the GUI; and modifying the GUI to display a driving guidance information providing screen associated with outputting navigation guidance information according to the selected user navigation route, in response to the user inputting a request via the GUI to begin the navigation guidance.

2. The method according to claim 1, further comprising:
transmitting navigation route information to an external device for storage in a database, in response to the user inputting data associated with the navigation route information, the navigation route information including a navigation route and metadata associated with the navigation route, the navigation route including a departure point, one or more stopovers and a destination.

3. The method according to claim 1, wherein the information screen displayed on the GUI includes:
outputting a departure point, one or more stopovers, and a destination associated with the selected user navigation route, metadata associated with the selected user navigation route, and a required time.

4. The method according to claim 3, further comprising:
changing the selected user navigation route to a changed user navigation route, in response to the user inputting a request to change at least one of the departure point, the one or more stopovers, or the destination.

5. The method according to claim 4, further comprising:
outputting the navigation guidance information according to the changed user navigation route, in response to the user inputting the request to begin the navigation guidance.

6. The method according to claim 4, further comprising:
transmitting information associated with the changed user navigation route to an external device for storage in a database, in response to the user inputting a request to store the changed user navigation route.

7. The method according to claim 1, further comprising:
requesting input of an evaluation score associated with the selected user navigation route; and
transmitting the evaluation score to an external device for storage in a database in association with the selected user navigation route, in response to receipt of the input of the evaluation score.

8. The method according to claim 1, further comprising:
requesting input of an evaluation score associated with a stopover included in the selected user navigation route; and
transmitting the evaluation score to an external device for storage in a database in association with the stopover, in response to receipt of the input of the evaluation score.

9. The method according to claim 1, wherein the one or more user navigation routes associated with the metadata search term each includes a recommendation index determined based on an evaluation score associated with the user navigation routes, and
the outputting the one or more user navigation routes associated with the metadata search term includes sorting the one or more user navigation routes based on the recommendation index.

10. The method according to claim 1, wherein the outputting the navigation guidance information according to the selected user navigation route includes outputting a recommended stopover for changing the selected user navigation route to a new navigation route.

11. The method according to claim 10, further comprising:
determining the recommended stopover based on one or more of a current time or a navigation time period.

12. The method according to claim 10, further comprising:
determining the recommended stopover based on a current location on the selected user navigation route.

13. The method according to claim 1, wherein the metadata search term includes a search term used to search for hashtags associated with navigation routes registered by another user.

14. The method according to claim 1, wherein the outputting, via the results pane of the GUI, the one or more user navigation routes corresponding to the metadata search term includes outputting a navigation route associated with the metadata search term and a navigation route that is stored by another user registered as a contact of the user.

15. The method according to claim 1, further comprising:
outputting, while providing the navigation guidance based on the selected user navigation route, a request to change the selected user navigation route to a new navigation route recommended by another user registered as a contact of the user.

16. A method of providing navigation guidance based on user navigation routes to a user via a graphical user interface (GUI) of a user terminal, the user terminal including a display configured to display the GUI and one or more processors, the method comprising:
displaying, via the GUI, a user driving route search screen having a search box configured to receive a metadata search term and a results pane configured to display a result of a search inputted into the search box;
receiving, via the search box of the GUI, the metadata search term input by the user;
determining, one or more user navigation routes to provide to the user by instructing a server to search for hashtags associated with the one or more of the user navigation routes that correspond to the metadata search term and receiving, from the server, the one or more of the user navigation routes having the hashtags corresponding to the metadata search term input by the user, the user navigation routes being generated by an account associated with another user terminal subscribed to by the user of the user terminal;

outputting, via the results pane of the GUI, the one or more of the user navigation routes corresponding to the metadata search term;

modifying the GUI to display an information screen associated with a selected user navigation route, in response to the user inputting the selected user navigation route from among the one or more user navigation routes displayed on the results pane via the GUI; and modifying the GUI to display a driving guidance information providing screen associated with outputting navigation guidance information according to the selected user navigation route, in response to the user inputting a request via the GUI to begin the navigation guidance.

17. A non-transitory computer-readable recording medium storing instructions that, when executed by one or more processors of a user terminal, cause the user terminal to perform the method according to claim 1.

18. A user terminal configured to provide navigation guidance based on user navigation routes, comprising:
　a display device configured to display a graphical user interface (GUI) to a user;
　a memory configured to store one or more computer-readable programs; and
　one or more processors configured to execute the one or more computer-readable programs to configure the user terminal to:
　　display, via the GUI, a user driving route search screen having a search box configured to receive a metadata search term and a results pane configured to display a result of a search inputted into the search box,
　　receive, via the search box of the GUI, the metadata search term input by the user,
　　determine, one or more user navigation routes to provide to the user by instructing a server to search for hashtags associated with the one or more of the user navigation routes that correspond to the metadata search term and receiving, from the server, the one or more of the user navigation routes having the hashtags corresponding to the metadata search term input by the user,
　　output, via the results pane of the GUI, the one or more of the user navigation routes corresponding to the metadata search term,
　　modify the GUI to display an information screen associated with a selected user navigation route, in response to the user inputting the selected user navigation route from among the one or more user navigation routes displayed on the results pane via the GUI, and
　　modify the GUI to display a driving guidance information providing screen associated with outputting navigation guidance information according to the selected user navigation route, in response to the user inputting a request via the GUI to begin the navigation guidance.

19. The user terminal according to claim 18, wherein the user terminal is further configured to,
　transmit navigation route information to an external device for storage in a database, in response to the user inputting data associated with the navigation route information, the navigation route information including a navigation route and metadata associated with the navigation route, the navigation route including a departure point, one or more stopovers and a destination.

* * * * *